United States Patent [19]

Pryor

[11] Patent Number: 4,666,303
[45] Date of Patent: May 19, 1987

[54] ELECTRO-OPTICAL GAP AND FLUSHNESS SENSORS

[75] Inventor: Timothy R. Pryor, Windsor, Canada

[73] Assignee: Diffracto Ltd., Canada

[21] Appl. No.: 512,739

[22] Filed: Jul. 11, 1983

[51] Int. Cl.$^4$ .............................................. G01B 11/14
[52] U.S. Cl. ................................................... 356/375
[58] Field of Search .................... 356/375, 376, 378, 1

[56] References Cited

U.S. PATENT DOCUMENTS

| | | | |
|---|---|---|---|
| 3,180,205 | 4/1965 | Heppe et al. | 356/375 |
| 3,976,382 | 8/1976 | Westby | 356/376 |
| 4,277,175 | 7/1981 | Karasaki et al. | 356/378 |
| 4,373,804 | 2/1983 | Pryor et al. | 356/1 |
| 4,498,776 | 2/1985 | Smith | 356/375 |
| 4,541,721 | 9/1985 | Dewar | 356/376 |

FOREIGN PATENT DOCUMENTS

| | | | |
|---|---|---|---|
| 0146005 | 11/1980 | Japan | 356/384 |
| 0118604 | 9/1981 | Japan | 356/375 |
| 0082106 | 5/1983 | Japan | 356/375 |
| 0783524 | 9/1957 | United Kingdom | 356/375 |

Primary Examiner—R. A. Rosenberger
Attorney, Agent, or Firm—Larson and Taylor

[57] ABSTRACT

This invention relates to the electro-optically based sensor units of use in measuring the "fit up" of panels as on car bodies, aircraft, etc. The disclosed invention is capable of measuring both the gap between the adjacent panels and their relative positions to obtain the width of the gap, the location of the edges of the panels can be estimated by fitting curves to the measured data, or "flushness", in the direction out of plane. Embodiments include a hand-held portable unit capable of being used on finished assemblies such as car bodies, and aircraft sections, as well as on "ring" gages in which a single test panel is checked relative to a reference frame or "ring".

4 Claims, 15 Drawing Figures

ELECTRO-OPTICAL GAP AND FLUSHNESS SENSORS

FIELD OF THE INVENTION

In the manufacture of cars it is highly desirable for "customer aesthetic" purposes that the panels, such as doors, for example, when fitted together with the other panels, have a uniform gap falling within a nominal size as one looks along the gap. As well, the panels should be essentially as flush as possible, that is, in the same plane, at their joining edges. This condition is often difficult to achieve in practice and requires rigid statistical controls on the panel production and assembly in order to insure that quality can be maintained. The measurements required for such control occur both at the stamping or plastics facility in which a single panel is compared to a master ring (simulating the fit of the other panels around it) or on the finish welded car "body in white" or even the final assembled and painted car.

In the aircraft business, similar requirements exist, although in this case for much more functional reasons, namely that any lack of flushness condition or poor match of the panels can cause excessive air drag.

BACKGROUND OF THE INVENTION

The principal prior art in all of these areas are mechanical feeler gages and flush pin gages which have been historically used for these measurements. Lately, the error prone manual recording of data from such feelers has been replaced by a mechanical type of caliper containing an electronic sensor such as an LVDT which is capable of measuring either gap or flushness at any one time and communicating this to a data acquisition module.

While a great improvement in eliminating errors in recording data, these present mechanical feelers, such as the one sold under the name "Datamyte" still suffer several disadvantages.

1. They require two steps to take the data to obtain both gap and flushness, the first step being to insert feeler in the gap, and the second to turn the unit over and press it against the panel to read flushness.

2. The gap width must be at least a minimum of several millimeters in order that one can stick a relative cumbersome mechanical feeler into the gap. This requires expensive modification of large numbers of existing fixtures or setting up of measuring problems in an artificial manner to achieve such larger gaps in many cases. In addition there are some small gaps as on aircraft that are simply unmeasurable in this fashion.

3. The mechanical contacts are subject to wear and breakage, both of the contact unit itself and of the object contacted. This means that it is difficult to use such units on plastic or on painted surfaces where the paint can be scraped off by the action of the feeler.

4. Due to some of the mechanical aspects the measurements are generally less repeatable than those of the present invention when used in a hand-held manner.

5. Because of the requirement for mechanical insertion and contact into a narrow gap, such units are useless for automatic robotic inspection.

SUMMARY OF THE INVENTION

In general, the present invention relates to preferably non-contact sensors for the applications described above more particularly to a hand-held unit that can be used easily by operators in accumulating statistical data. Further embodiments involve other varients which can be used on robots for automated measuring. All of the above disadvantages are obviated by the sensor unit of the invention.

DESCRIPTION OF THE PREFERRED EMBODIMENTS

Figure 1A:
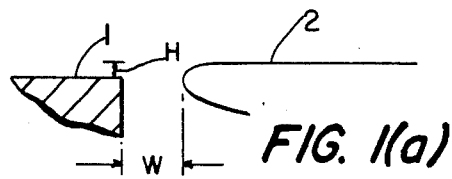
FIGS. 1(a) and (b) are illustrations used in explanation of the general measurement situation on car body ring gages.

FIG. 1(a) is a cross section layout of the typical measuring situation wherein a gage rail, denoted 1, is used as a reference and is set up to roughly equivalent size to a panel, denoted 2, to be inspected, but is, for example, 3 mm oversize (W=3 mm). This reference gage rail, is generally placed all the way around the panel (such as the car rear door shown in FIG. 1(b)) or could be only over a portion.

In any case, the gage rail 1 follows the contour of the panel 2, and forms a "ring", which is used to simulate essentially a master opening in the car body into which the door is to fit. The door panel 2 is placed into this and referring to the cross section of FIG. 1(a), we see that a gap of width "W" and a flushness condition of height "H" exists.

The distance "H" can either be positive or negative, with a zero "H" or "flush" condition being the desired case. In the case of the gap W, it is desired that a nominal gap of + or − some nominal value (e.g. 3 mm) be maintained, generally with a tolerance of + or −1 millimeter. Of more importance generally, however, is not the absolute gap but the change in gap along the edge, i.e., from the top of the door to the bottom. When this varies considerably as for example 1 or 2 millimeters (eg. W=3 to W=5 mm), the deviation from a parallel panel condition is very noticeable to the eye and objectionable. On aircraft however, it is desired that this gap be minimal all the way along and that again the flushness (or in aircraft parlance the "mismatch") be effectively zero (H=0).

The gage rails which have typically been used have been made of hardened steel and are quite expensive to design and make. Every time a panel design is changed, the gage rail has to be changed as well and in new model runs this can happen several times before the product is released to the public resulting in great expense. Some rings even for simple hoods have been known to cost $200,000 and for a quarter panel, $400,000.

Figure 2:
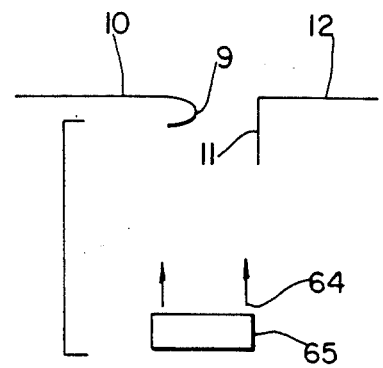
FIG. 2 illustrates the situation on adjacent panels of appliances, aircraft and finished car assemblies.

In FIG. 2, another situation is illustrated wherein the gap and flushness of an assembled car body, refrigerator, finished painted car or aircraft is checked. In this case, there is no reference rail, the reference is now provided by one panel to the next and not a master gage rail to the panel.

Illustrated in FIG. 2 are two other types of panel conditions, namely, a clinched edge 9 of a panel 10 such as on a door, and a "down standing flange" 11 of a door pillar 12 (for example). These conditions often can occur and can cause different type of reading problems as discussed below. FIG. 2 is also described below.

Figure 3A:
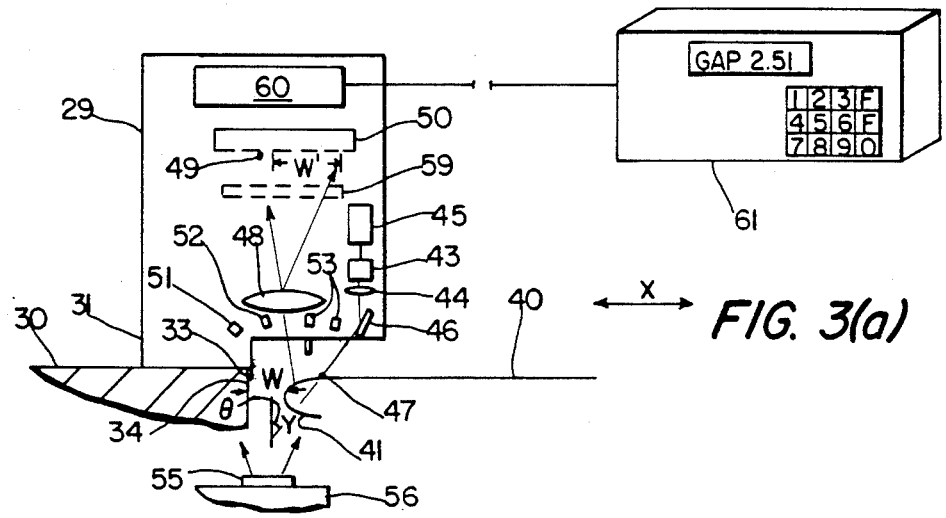
FIG. 3(a), 3(b) and 3(c) illustrate a basic hand-held sensor device according to the invention for use on either ring gages, bodies in white or finished assemblies. Also shown are the use of transmitted light, reflected light or reflective tape.
Figure 3B:
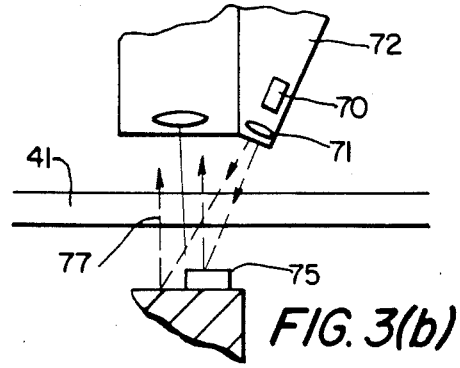

Referring to FIG. 3(b) there is illustrated a first sensor embodiment according to the invention. Before proceeding, it should be noted as discussed above that present practice has been to stick calipers or feeler gages into the gaps as well as resting plates and using the depression of flush pins on the surfaces for the flushness. These are mechanical activities with considerable amounts of error and non-repeatability plus, of course, wear of all parts.

Figure 4:
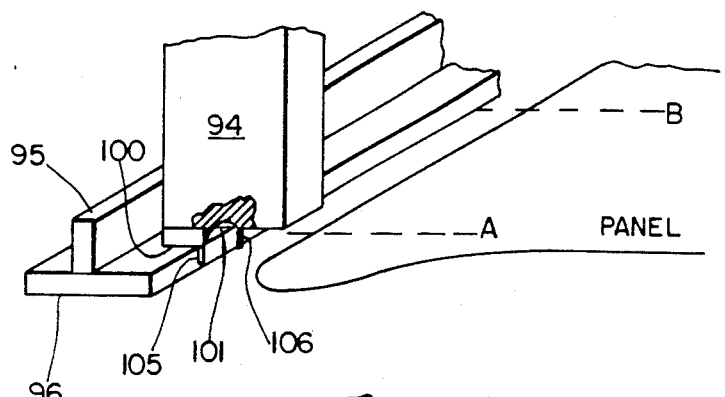
FIG. 4 illustrates the use of a slider rail to move the sensor unit along a continuous path on a ring gage. This rail can also be attached with suction cups or the like to one panel and used to scan panel gaps.

In the diagram of the sensor unit shown in FIG. 3(a), the sensor unit is located in a housing 29 which is manually positioned, in this case, on a gage rail 30 using the portion of the housing, denoted 31, to rest on the gage rail 30. Usually this portion is comprised by two bars as shown in FIG. 4. Optionally, feet or "claws" indicated at 33 in FIG. 3(a) can be utilized to position the housing in the "X" direction to be against the rail. This is often helpful for manual location but is generally not necessary for measurement since the edge of the rail is imaged by the sensing unit. However, if a good image of the rail cannot be obtained, then the feet can be pressed against the rail 30 to reference the lens (the array position from which measurement of edge 41 is determined). This applies to the case where gage rails are damaged, for example those which are made out of fiberglass, wood, and other materials which cannot withstand abuse.

The gap and flushness of the panel 40 relative to the gage rail 30 is determined in the flushness case by projecting a zone of light, in this case a spot, from a diode laser 43 (eg. a Laser Diode Labs LCW 10) with a power supply 45, imaged by a lens 44 and deflected by a mirror 46 to form a spot 47 on the part surface. This spot 47 is imaged by a lens 48 to form an image 49 on an image scanning detector, which in this preferred case, is a photo detector array 50. This array, which is, for example, a Reticon 1024G photo diode array, is then scanned out by a scanning chip module 60 to microcomputer readout 61 a function of which would be discussed below.

The triangulation equations which can be used to obtain the height H of panel 40 relative to the reference established by portion 31 and rail 30 are discussed, for example in U.S. Pat. No. 4,373,804 by T. R. Pryor et al.

The readout circuitry 60 can be that disclosed, e.g., in U.S. Ser. No. 163,290 filed 6/26/80 by the inventor and his co-workers.

To obtain the gap dimension W, the gap is illuminated by light emitting diodes (LEDs) 51, 52, or 53 which may also be accompanied by additional LEDs spaced in the same locations on the opposite side of the axis of lens 48 or elsewhere as desirable. In any case, the edge 34 of the ring 30 and edge 41 of part 40 are illuminated and the reflected light therefrom provides an image of the gap "W" on array 50 via lens 48. This image is read out as a dark element gap by using derivative techniques such as disclosed in U.S. Ser. No. 163,290 referred to above or binary thresholds as disclosed in U.S. Ser. No. 269,614 filed 6/2/81, by the inventor. It is noted that the major difficulty, if any, of this procedure is the varying radius of the edge 41 which can cause different gap readings to be obtained. (The primary reason is that unless very powerful light sources are used, which is impossible in a hand held unit with LEDs, there may not be sufficient light returning from the tangential panel edge to the detector.)

To obviate these difficulties one can simply calibrate the system, particularly since at each point on a panel type the radius usually stays relatively constant from one panel to the next. Since the apparent (optical) gap is almost always greater than the (mechanical) "real" gap, one can just subtract a constant number (e.g., 0.015") from the measured gap to determine the mechanical gap at that point. Obviously a different calibration constant is needed for each radius condition. On crimped door edges, the difference is small, typically 0.002", while on rough window headers it can be 0.020".

There is also an argument that the apparent "optical" gap on cars is the one the customer sees, and this is therefore the "true" reading.

Alternatively, it is sometimes desirable to place a reflecting element such as reflective tape 55 on another portion of the fixture 56 onto which the gage ring 30 is attached. In this case, the light from the light sources, such as 51 for example, hits the tape and bounces back through the gap creating essentially a shadow edge of the gap as opposed to a reflected image. This is generally more consistent with mechanical measurements of the gap than is the optical image using reflected light. For example, correlations of + or −0.025 mm due to all causes have been obtained in practice.

Referring to FIG. 3(b), when using tape it can be desirable to bring the light source in from an angle such as is provided by a diode laser 70 in a housing 72 focused by a lens 71 onto the tape 75 on the fixture. Reflections 77 from the surface of the part 40 do not enter since they are out of the field of view of the detector. Note that FIG. 3(b) is rotated 90 degrees from FIG. 3(a).

Figure 3C:
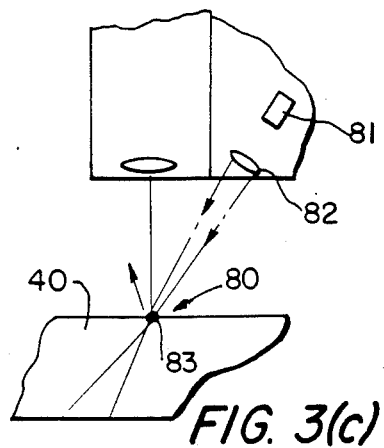

Referring to FIG. 3(c) on finished cars, it can be desirable to utilize such angled lighting to illuminate the surface 40 of the car as shown wherein the surface of the door edges, for example, indicated at 80 in FIG. 3(c), is illuminated by the light of a diode laser or flashed white light source, indicated at 81, focused by a cylinder lens 82 to a line 83 on part 80. It is noted that the area below the edge as the back of the door pillar is out of the view of the detector and therefore does not interfere.

Another point is that in FIG. 3(a), when reflected tape is utilized, it is often desirable only to have on-axis illumination such as from light source 51 only. However, when the tape is not used one generally wants broad illumination or a very powerful illumination coming at an angle. This would be the broad illumination provided by numerous light sources such as 51, 51, and 53 or the illumination sources such as 81, possible using a remotely located source connected through a fiber optic cable.

In normal operation, one places the sensor unit onto the gage rail (or reference panel) and measures at a plurality of points around the periphery of a part. This is commonly done for example at 15–30 points around the surface for both "flush" and "margin" (gap) conditions.

Figure 1B:
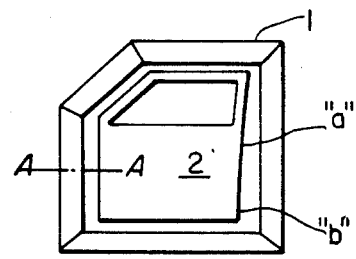

For example, with normal operation, the operator might place the unit at point "a" (as shown in FIG. 1(b)), punch the read button which would enter this value of flushness and margin into the microcomputer readout unit 61 (FIG. 3(a)). He would then go to the other remaining nineteen (say) points in succession with the computer 61 knowing that these points were 1 to 20 in total on that panel and the fixture number, each fixture being set up for a specific type of panel. When the operator gets to the next fixture, he simply punches in the fixture number of that one and goes through the same procedure, which might, at that stage, require 24 points. Of course, this is known to the control computer which can be housed in the portable unit or at a remote place into which the data is dumped at the end of a shift for example.

At the end of the day or shift, the tally of the data taken including statistical distributions is made of each point on each panel.

An alternative is that the operator can key in exactly what point he is at rather than rely on a succession of numbers with no keying. Naturally, any number of other things such as bar code wands, voice commands through speech recognition, logic, etc can be used to tell the computer 61 what panel is being measured and what point.

The operation of the embodiment of FIG. 3(a) is described in further detail below.

Referring to FIG. 4, a data gathering mode possible with this invention (but virtually impossible with any contacting type device), involves actually scanning the sensor along the panel edge and recording a very large number of values of W and/or H. In the preferred embodiment, one would say start at point "a", as in FIG. 1 and move to point "b", sliding a sensor 94 as depicted in FIG. 4 along a reference rail 95 as shown. This reference rail 95, which is attached to gage rail 96, acts as a rest for the back of the hand-held sensor 94 and allows the operator to have a firm resting point. However, since the gage can read the edge of the reference of the gage rail, slight mislocations in the "W" direction while sliding can be taken out.

In the preferred mode of operation, the computer simply stores the average, the high, and the low value of all W and H values between "a" and "b" and enters these average values into the computer memory storage. This is particularly desirable since one can typically take several hundred readings a second using a high speed scanning array and thus accumulate, if the array is slowly swept, thousands of actual readings between point "a" and point "b". That much information is not generally desirable in toto, rather only whether or not the panel is deviating. This can happen in a local area due to stamping problems and the like. The same holds true in molded parts with waves and other defects at the edge.

This continuous operating mode is an important aspect of the invention and again is something not obtainable mechanically. This operation can also of course be done using a robot to move the sensor unit as is discussed below.

It is also possible to slide the unit along the gage rail using the contact feet 105 and 106 that have been shown in FIG. 4. However, such contact feet may not provide as good a reference as a larger back stop bar 95 shown. Note that in FIG. 4 the gage rests on the rail on two contact bars 100 and 101 rather than a flat base. This gives a two line contact even when the rail curves in the direction along the edge (as in a contoured door).

Figure 5:
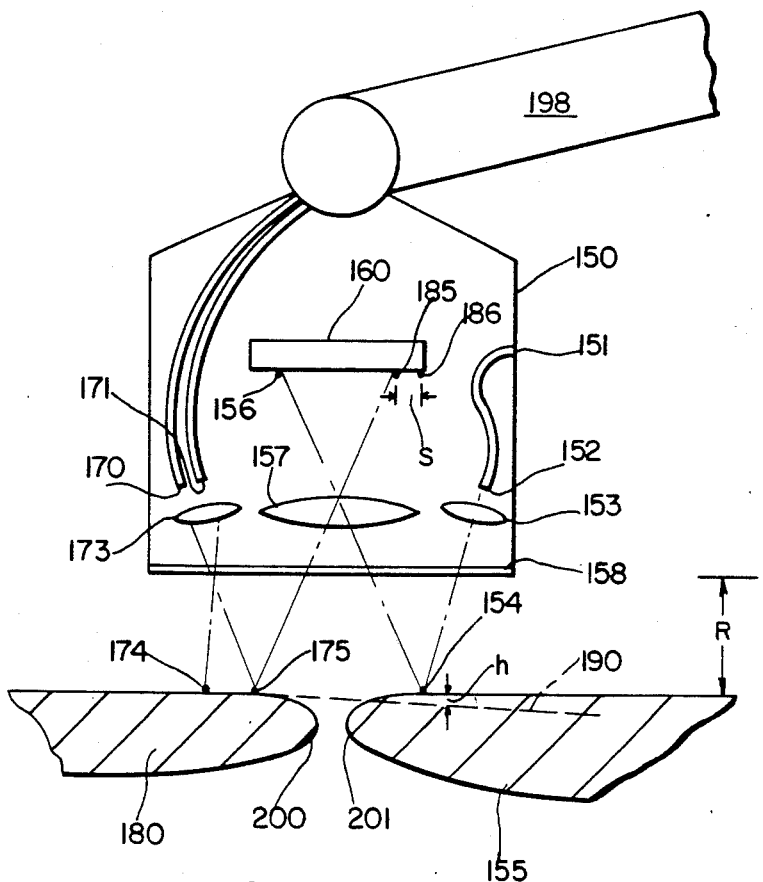
FIG. 5 illustrates the sensor unit for use on a robot in which additional measuring points are taken on either a ring rail or panel to establish a straight line from which the reference flushness measurement can be made. It is noted that, as explained below, this robot can be an inaccurate positioning type (in which case the ring gage acts as the reference member) or an accurately positionable type (in which case the ring is not required). It is further noted that the robot, since it does not touch the reference ring, can be crudely made and the application calibrated by using a calibrated master panel measured on a coordinate measuring machine or elsewhere to establish the ring locations from which future references are made.

Another sensor unit according to the invention is shown in FIG. 5. In this case, a robot or other means is utilized to position the sensor near the panels 180 and 155 as the door and fender on a finished car. However, in this case it is not desired to actually contact the panels and therefore another reference system is utilized. For the moment, let us consider only the triangulation measurement of flushness points to obtain H. In this case, in the sensor housing 150 having a window 158 a fiber waveguide 151, with free end 152, emits diode laser radiation from a remote source (not shown) which is imaged by a lens 153 to form a spot 154 on a panel 155. This spot is then imaged by a lens 157 to form a spot image 156 on a diode array 160 much as in FIG. 3(a). In this case, however, the reference line for the measurement is not provided by the contact bars on a gage rail or panel but instead by two other spots whose location in space is determined to form a straight line reference, indicated by dashed line 190, from which the height location H of spot position 154 can be obtained. This is achieved by utilizing a convenient light source such as diode lasers or, in the illustrated embodiment, optical fibers 170 and 171 carrying diode laser beams which are imaged by a lens 173 to form spots 174 and 175 on the other adjacent panel 180. These are again imaged by lens 157 to form spots 185 and 186 on diode array 160. Using techniques disclosed in the above-referenced applications, the position of spots 185 and 186 can be determined so as to determine the relative attitude of the panel 180 when the sensor unit is at the nominal range (see also U.S. Pat. No. 4,373,804 referred to above). Suitable diode lasers are Laser Diode Labs LCW 10's with 10 mw output and integral fiber pigtails, having approximately 2 mw output power at the end of a 6 foot fiber length.

In one mode of operation, the sensor unit 150 is moved in toward the panels by a robot such as indicated at 198 until spot images 185 or 186, or preferably, the sum of the average of the two, is located on a specific point on the array indicating that the sensor unit is at fixed range "R" from the part 180. At that point the spacing, S, between spots 185 and 186 is determined on the array which then corresponds to a certain tilt of the sensor unit housing 150 to the line between spots 174 and 175 on part 180. This then sets up the measurement line 190 from which the flushness position 154 is to be determined and the value "H" is determined therefrom.

In addition to these flushness readings, the image of the edges 200 and 201 can be determined using techniques discussed above relative to FIGS. 3(a)–3(c).

The embodiments discussed above use linear photo detector arrays to make all the measurements required. Such units are the easiest to build and the most practical for battery powered operation with low power requirements. However, in certain cases, "light section" type techniques using matrix detector arrays are desirable. Such an embodiment is shown in FIGS. 6(a) and 6(b).

Figure 6A:
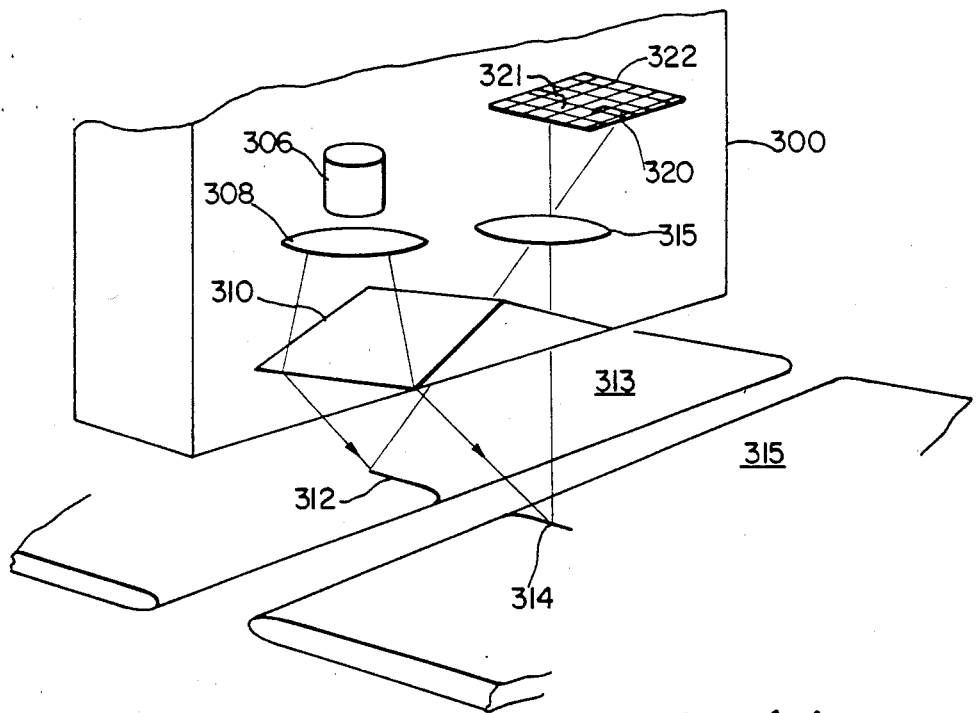
FIGS. 6(a) and 6(b) illustrate a light section sensor version of the invention using a matrix rather than a linear detector array.
Figure 6B:
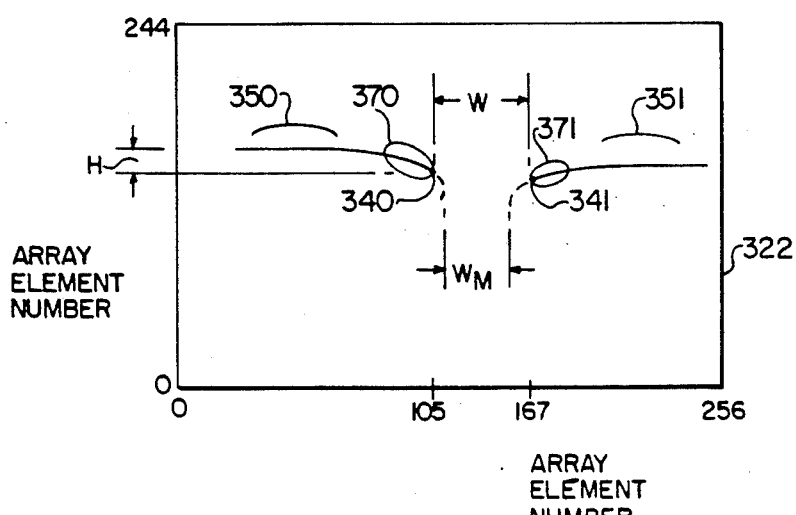

FIG. 6(a) illustrates a light section embodiment of the invention which utilizes a diode laser 306 in a housing 300 to project, via a cylinder lens 308, a strip zone 312 and 314 of light across the gap via a prism 310. This light, when imaged by a lens 315, also via the prism 310, provides two images, one of each side of the strips 320 and 321 onto diode array 322. This gives the contour of the radius of the edge which also allows one to calculate back from the gap to find the choice of points for flushness measurement.

The gap so measured is in general not the mechanical gap since the amount of light coming back may not be suffucient from the tangential edges. In other words, as in the case of the sensor of FIG. 3(a) above, the actual mechanical gap is narrower than the apparent (optical) gap. However, unlike the case of FIG. 3(a), one can, in this case, closely predict the tangential point of the edge falloff.

This light section advantage allows one to see a large number of data points and to help eliminate spurious signals on the parts due to striations, burnishes and other marks etc. on the edges of the panels which can sometimes cause difficulty in the apparatus of FIG. 3(a). The embodiment of FIGS. 6(a) and 6(b) also, as mentioned, allows the calculation of the "true" (mechanical) gap from the calculation of the apparent falloff of the radius and the predicted tangent point to predict a true mechanical gap. These are both good advantages and would cause this to be preferred embodiment except for the fact that the matrix array requires considerably more processing effort and computer complexity making it more difficult to provide a low cost, hand-held unit, at least at the present time. It is noted that the sensor housing 300 could be laid on to the surface of one panel and used to sense the other or it can be robot mounted as in FIG. 5, or hand-held as FIGS. 3(a)–3(c) and useable both on gage rails and completed car bodies. The operation of the embodiment of FIG. 6(a) is considered in more detail below in connection with FIG. 6(b).

Figure 7:
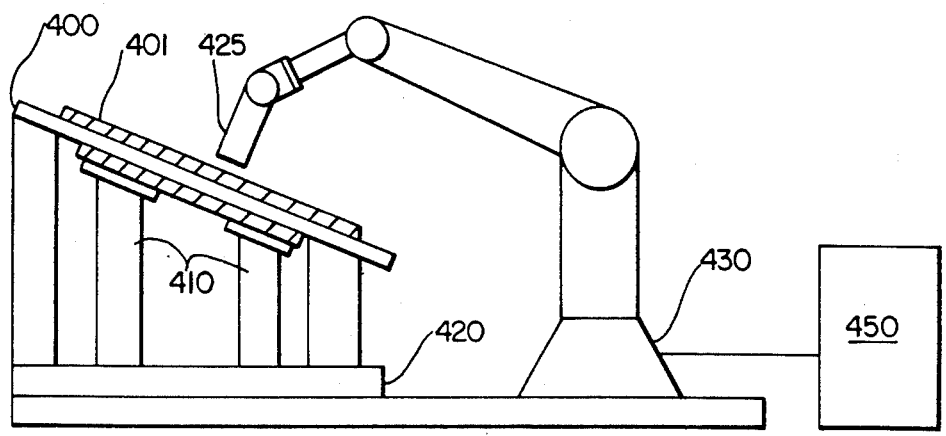
FIG. 7 illustrates a robot inspection version of the invention utilizing a low cost, "inaccurate" robot and a reference ring.

FIG. 7 illustrates the use of a typical gage ring 400 mounted on a base 420 containing supports 410 onto which a panel 401 is supported relative to the gage rail on the locating points. A sensor unit 425 which can, for example, be either of the types dicussed in connection with FIGS. 5 or 6 above, is located on a robot 430 which is moved under control of a computer 450. This robot then moves the sensor unit to each of the positions along the gage rail in question taking the data either pointwise as shown in FIG. 1(b), points "a", "b", etc., or in a scanning mode as shown in FIG. 4 where the robot 430 simply moves the sensor unit 425 along the rail parallel to the gap. Since nothing need contact the rail and since in both FIGS. 5 and 6, ways have been shown of measuring both surfaces and edges and setting up the measurements therefrom, one does not need to have truely accurate robot positioning since the gage rail determines the accuracy of the system. This allows relatively inexpensive robots to be used which do not have sufficient dimensional accuracy to act as a suitable reference in and of themselves.

Furthermore, since the system is totally non-contact, the gage rail need not be an expensive precision tooled component at all but can simply be formed into place possibly even using destructible material such as wood or plastic. In this case, one would then place a master panel (premeasured on a coordinate measuring machine, for example) into the gage fixture and utilize the robot to then scan that panel relative to the ring and from that determine the ring coordinates from which future panels would be compared. Comparison of more than one master panel in this way, e.g., "max" and "min" size masters, would allow one to better set it up.

It is noted many other triangulation or edge image sensors can be used in this mode with low cost robot and/or rings, not just those of FIGS. 5 or 6.

It is noted that where LEDs and diode lasers have substantially the same wavelength, a narrow bandpass filter such as filter 59 of FIG. 3(a) can optionally be used to desirably reject ambient light.

Referring again to FIG. 3(a), the operation of that embodiment of the invention in one preferred mode thereof will be further described. First LEDs 51–53 (and/or other edge illumination sources as appropriate) are turned on by microcomputer readout 61 and rail edges 34 and panel edge 41 are illuminated (together with nearby portions of said rail and panel). The image of the panel and rail so illuminated is formed by lens 48 on detector array 50, a Reticon 512 G comprising 512 elements on 0.001" centers. Lens magnification is typically in the range of 0.5:1 to 2:1, with approximately 1:1 being most desirable with this choice of detector array (approx. 2:1 is shown in the drawing).

The detector array is scanned out under control of microcomputer 61 and the values of the individual detector element intensities are read into memory.

Figure 8A:
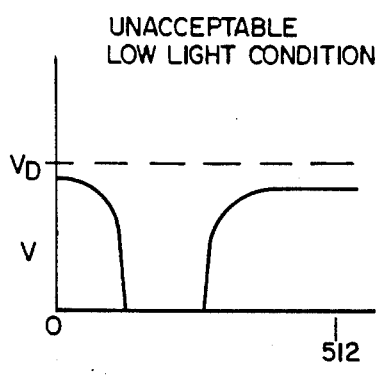
FIGS. 8(a), 8(b), 8(c) and 8(d) schematically illustrate signal processing methods according to the invention.
Figure 8B:
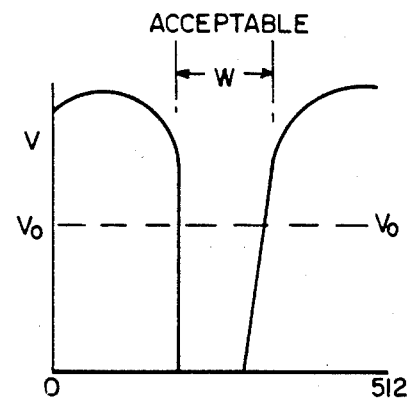

The array output is analyzed and if the edge image transition is over a certain value, the reading of gap image "W" is accepted. This is illustrated in FIGS. 8(a) and 8(b). If light level is insufficient, array integration time and/or light power is increased by an increment and a second scan made. This procedure is continued until sufficient edge intensity is obtained.

The gap image W' is calculated as the number of detector elements less than threshold value $v_o$. If magnification is 1:1, this is equal to gap W.

The principal problem with this measurement is effects due to various radius samples and in certain rare cases by burnish marks on the panel radius which create a local "spike" of light.

For flushness measurement, the height H is determined as follows. The diode laser spot 47 projected on the surface is imaged by lens 48 to a spot image 49 on array 50. The position of the spot 49 on said array is a function of the height of panel 40 relative to the lens 48, itself supported by a housing positioned rigidly on gage rail 30, as a reference. Because of the included angle $\theta$ between the lens axis and the incidence direction of the projected spot, a change in position of the panel, for example, away from the sensor would cause the spot 49 to fall to the right. This spot position can be related to panel position H using known triangulation equations, or by suitably calibrating the system (by placing a panel at known H values) and using a table of calibration values stored in computer 61.

Figure 8C:
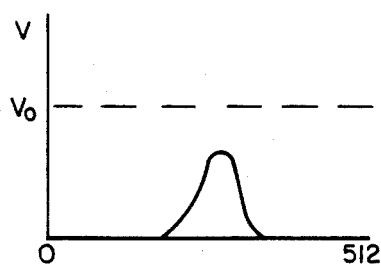
Figure 8D:
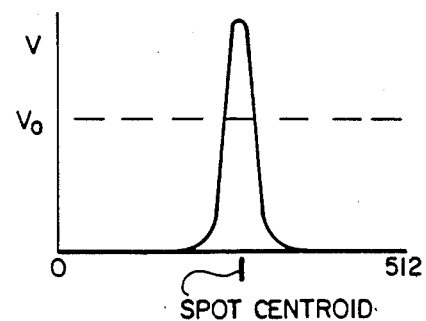

The light level for flushness measurement can also be controlled by reading the array elements and determining if the value exceeds the threshold, as shown in FIGS. 8(c) and 8(d). Alternatively, a reference detector such as unit 60 shown in FIG. 3(a), can be used to detect reflected light spot intensity to control light power or integration time.

When reference tape or back lighting (e.g., as provided by source 65 in FIG. 2) is used, the number of detectors above a certain intensity level $V_o$ gives the width W. It is noted that by incrementing power or integration levels, and averaging scans above the level, a statistical resolution in excess of the diode spacing is obtained.

Referring to FIGS. 6(a) and 6(b) the operation of the sensor unit of this embodiment will now be further described. For clarity, ignoring the inversion properties of lens 315, the image section of strip 312 on panel 313 is scanned raster fashion and the edge 340 is determined as the last observable image point, in column 105 of a 256×244 element matrix diode array (such as a GE TN2500) shown in FIG. 6(b). Similarly, the edge 341 of the image section of strip 314 on panel 315 is determined as lying in column 167 (see FIG. 6(b)) for a net image gap of 167−105=62 elements. At 0.3:1 magnification including the effect of the triangulation included angle 0 (typically 40–90 degrees), this corresponds to a panel gap W=0.186″ (if the elements are on 0.001″ spacings).

Similarly, the quantity "H" is found by determining the surface locations of the quasi-linear sections 350 and 351 of the two respective edge images (typically occurring 0.25″ away from the edge or more) and by determining the matrix element row in which they fall, thereby obtaining a value for H. Centroid finding circuitry disclosed in the above-referenced applications can be used for this. Straight line fit equations can be calculated by the microcomputer if desirable and any tilt of both panels relative to the sensor can thus be removed.

It is noted that the apparent gap "W" so measured is often larger than the actual mechanical gap "W"$_m$, because light is undetectable from the actual tangential edge area. This is particularly true if low powered light sources are used on black painted cars, for example. In this case, it is desirable to fit curves to the edge radius zones 370 and 371 of the image sections and estimate from these curves where the tangent points should be, so as to predict the mechanical gap W$_m$.

It is noted that microcomputer 61, typically an Intel 8085 with 64K memory, can be used to calculate over, for example, 100 panels of the same type, the statistical distribution X and R (mean and range) at each of the, say, 20 panel points measured, for both flushness and gap. This data is then used to control the welding or stamping process for example.

It is also noted that wavelengths of electromagnetic radiation in the visible and near infra-red portions of the spectrum are preferred for these measurements. It is further noted that the invention may be used to measure only gap or only flushness. In these cases, components not required can be eliminated from the embodiments shown.

Such sensors have proven very reliable and capable of 0.1 mm or better repeatability under many car panel conditions. The flushness measurement often exceeds 0.05 mm.

It is further noted that the light 64 or reflective tape 55 used to provide, in effect, transmitted light illumination of panel edges can be attached to the sensor housing (such as housing 29 of FIG. 1(a)) itself and inserted through the gap in a manner so not to interfere with the field of view of the imaging system.

What is claimed is:

1. A method for determining the mechanical edge falloff of a contoured panel edge surface comprising the steps of:
    forming a light section detected image of a portion of said panel edge surface adjacent said edge falloff;
    determining the contour of said detected image;
    predicting, from the determined contour of the detected image, the remaining contour of said panel edge surface to the mechanical edge falloff and hence the location of the mechanical edge falloff relative to that portion of said panel edge surface imaged.

2. A method for determining edge falloff as claimed in claim 1 wherein the contour of the panel edge surface is predetermined; and further including the steps of determining, from the predetermined contour of the panel edge surface, the location in the predetermined contour of that portion of said panel edge which has been imaged.

3. A method for determining edge falloff as claimed in claim 1 wherein a set of observable points is produced by said formed light section; and wherein the determining step includes a curve fit to the observed points and a best fit curve projected to the edge falloff.

4. An apparatus for determining mechanical edge falloff of a contoured panel edge surface comprising:
    a forming means for forming a light section detected image of a portion of said panel edge surface adjacent said edge falloff;
    a determining means for determining the contour of said detected image; and
    a predicting means for predicting, from the determined contour of the detected image, the remaining contour of said panel edge surface to the mechanical edge falloff, and hence the location of the mechanical edge falloff relative to that portion of said panel edge surface imaged.

* * * * *